June 28, 1927.
K. BERGER
BRAKE MECHANISM
Filed Aug. 2, 1926
1,633,919
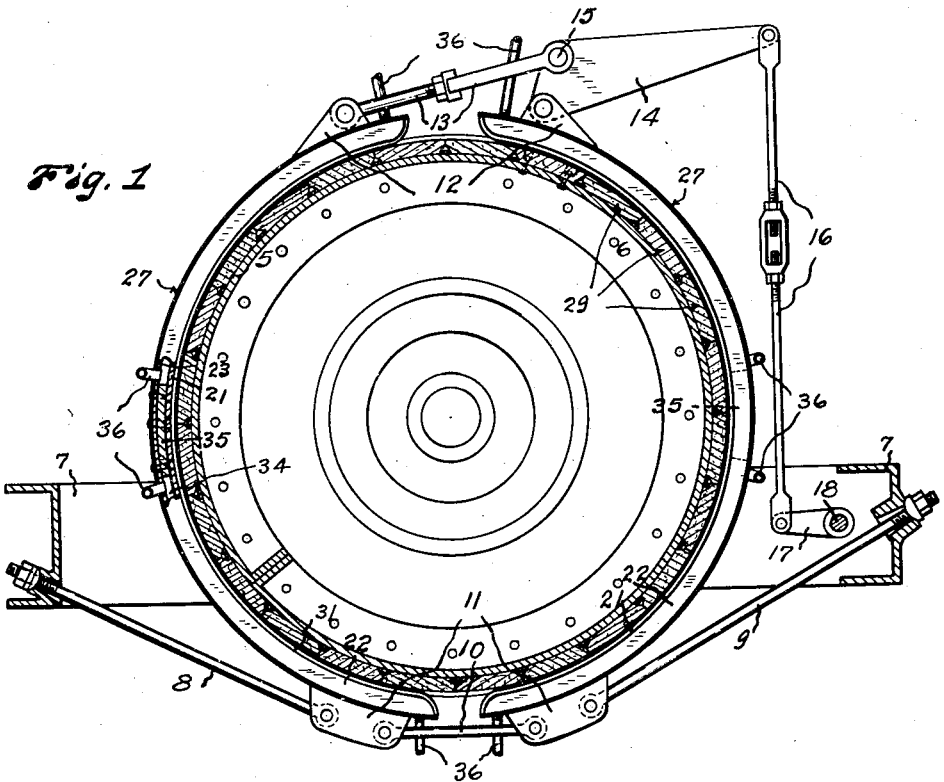
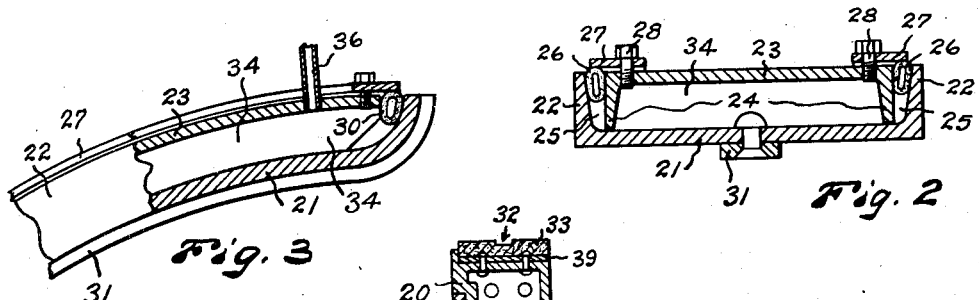
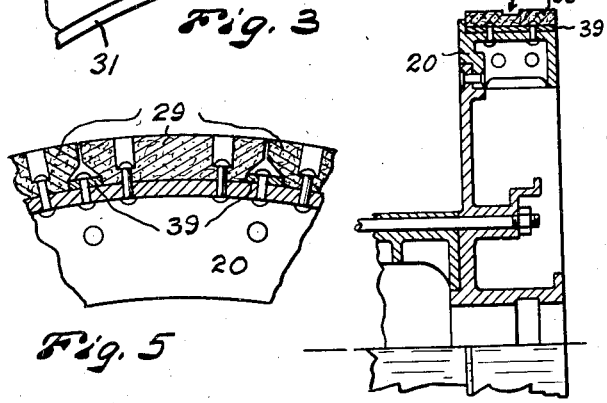
INVENTOR
Knute Berger
BY
Frank Warren
ATTORNEY Patented June 28, 1927.

1,633,919

UNITED STATES PATENT OFFICE.

KNUTE BERGER, OF SEATTLE, WASHINGTON.

BRAKE MECHANISM.

Application filed August 2, 1926. Serial No. 126,609.

My invention relates to improvements in water cooled brake mechanism for heavy logging equipment and an object of my invention is to provide a brake embodying a drum having an external band arranged to be kept cool by circulating a cooling agent, as water, therethrough.

Another object is to provide a brake mechanism embodying a drum having brake blocks removably secured to the periphery thereof and arranged to form the wearing surface of the drum, said blocks being easy to replace in case they become worn and said blocks further serving to insulate the drum from the heat generated by frictional engagement with the band thereby preserving the more costly drum against wear and against warping and cracking which is liable to result from excessive heat where the band is applied directly to a metal drum. Brakes of this type are ordinarily large and heavy and are used on logging equipment in the woods where transportation is difficult, where shop facilities are usually inadequate, making it impossible to repair a badly worn, or a cracked or broken brake drum, and where the incapacitating of a brake of this nature may cause much loss of time and money. The use of blocks prevents serious damage to the drum, the blocks are comparatively easy to remove and replace thus facilitating the process of repair and the use of the water cooled band prevents rapid deterioration of the blocks and band.

A further object of the invention is to provide water cooled brake mechanism that is strong, simple, and durable in construction, and that is inexpensive to manufacture.

Another object is to provide a water cooled brake embodying two substantially semi-circular shoes each formed of a wider channel shaped member with outwardly directed flanges and a narrower channel shaped member with inwardly directed flanges disposed to fit within said wider member so as to form water jacket spaces therebetween, said two channel shaped members having packing strips or rings disposed between their adjacent flanges to form a water seal and prevent leakage and said inner and outer members being riveted together midway between their two ends thereby affording the necessary flexibility.

In the accompanying drawings Figure 1 is a view in elevation of a brake constructed in accordance with my invention, parts of the band being shown in cross section and the drum on which the brake operates also being shown in cross section.

Fig. 2 is a cross sectional view on a larger scale of the band shoe of said brake.

Fig. 3 is a fragmentary view also on a larger scale, partly in section and partly in elevation, of one end of one of the band or shoe member.

Fig. 4 is a fragmentary sectional view of the drum on which the band or shoes may operate.

Fig. 5 is another fragmentary sectional view on a still larger scale of the brake drum, showing the manner of fastening the brake blocks to the periphery of said drum.

Referring to the drawings, throughout which like reference numerals designate like parts, I show a brake embodying two substantially semi-circular band members 5 and 6, adjustably supported from a frame 7 by truss rods 8 and 9 and connected together at their bottom ends by a link 10 that is pivotally secured to lugs 11 which are rigidly mounted on the adjacent bottom ends of the members 5 and 6.

The brake band members 5 and 6 are provided at their other or top ends with rigid lugs 12, one lug being pivotally connected with one end of an adjustable link 13 and the other lug being pivotally connected with a lever arm 14. The other end of the link 13 is connected by a pivot 15 to the lever arm 14. The outer end of the lever arm 14 is connected by an adjustable link 16 with a lever arm 17 on a shaft 18, which may be oscillated to move the lever arm 14 and tighten or loosen the brake band members 5 and 6, in an obvious manner, on a brake drum 20.

All of the parts hereinbefore described may be of conventional construction, the novelty of this invention residing in the cooling features embodied in the band members 5 and 6 and in the drum.

Each of said brake band members 5 and 6 is formed of an inner curved portion 21 of a channel shaped cross section having outwardly directed flanges 22, and an outer curved portion 23, also of channel shaped cross section and of narrower width than said inner member 21, and having inwardly directed flanges 24 arranged to fit inside of the flanges 22 of the inner portion 21. Spaces 25 for the reception of packing 26 are left between flanges 22 and 24. The packing members 26 are preferably of tubular form and are held in place by retaining plates 27 that are secured by screws 28 to the outer channel shaped members 23. A similar packing ring 30 is provided at each end of each brake shoe as shown in Fig. 3, the end rings 30 compensating for flexing of the brake band members.

The brake band members are curved at the ends, as shown in Figs. 1 and 3, and are each provided on the surface that binds on the drum with a rib 31 that fits within a groove 32 in a band formed by friction blocks 33 that are removably secured by rivets 29 to the circumferential wall of the drum. Metal strips 39 thinner than blocks 33 are riveted crosswise of the periphery of the brake drum between the ends of adjacent blocks to relieve the strain on the rivets holding said blocks and prevent the blocks 33 from being stripped off of the periphery of the drum by frictional engagement with the band. The blocks 33 are readily removable for the purpose of repairing or renewing the friction surface with which the band engages. Said blocks function as the usual brake lining and further serve as insulation means to prevent the drum from becoming overheated to such an extent as to crack or warp said drum. The use of the blocks 33 on the drum instead of applying a lining to the band as is ordinarily done, obviates the necessity of providing a water cooling system for the drum. The advantage of thus water cooling the band and avoiding water cooling of the drum arises from the fact that the drum rotates and the band is stationary.

The two channel shaped portions of each brake member 21 and 23 form, between them, a liquid chamber 34, and each of said chambers 34 is preferably divided into two compartments by a medial partition member 35. The two channel members 21 and 23 are preferably securely riveted together through the partition member 35 thus leaving each end of each brake member free to flex slightly. Each water compartment within each band member is provided at each end with a water service pipe 36 so that water or other fluid for cooling purposes may be circulated continuously through the water jacket spaces. The water service pipes may be connected with any suitable means, not shown, for forcing a circulation of cooling agent through the chambers 34, said cooling agent keeping the brake shoes cool at all times and conducting the heat away from the lining blocks 33 on the drum and preventing deterioration, due to heat, of all of the parts that are subjected to the heat due to frictional contact.

The foregoing description and accompanying drawings clearly disclose a preferred embodiment of my invention, but it will be understood that this disclosure is merely illustrative and that changes may be made within the scope and spirit of following claims.

I claim:

1. In a brake, a band, embodying curved members of channel shaped cross section having their flanges directed outwardly, other curved members of narrower width than said first named curved members and having inwardly directed flanges arranged to fit within the flanges of said first named curved brake members to form water circulation spaces, tubular packing strips interposed between said flanges of said outer and inner members and retaining plates for said packing strips.

2. In a water cooled brake, two substantially semi-circular brake shoes arranged to be tightened onto a brake drum, each of said shoes comprising a wider curved member of channel shaped cross section having outwardly directed flanges, and another curved, channel shaped, member of narrower width having inwardly directed flanges arranged to fit between the flanges of said wider member to form water circulation spaces, packing strips interposed between the flanges of said two members, retaining plates secured to the exterior of said narrower channel shaped members and overlapping said packing strips, means dividing the water circulation spaces in each brake shoe into different compartments and water circulation pipes connected with each compartment.

In witness whereof, I hereunto subscribe my name this 23rd day of July, A. D. 1926.

KNUTE BERGER.